United States Patent
Chen et al.

(10) Patent No.: US 10,289,914 B2
(45) Date of Patent: May 14, 2019

(54) METHOD, SYSTEM, AND DEVICE FOR PROCESSING VIDEO SHOOTING

(71) Applicant: ZTE CORPORATION, Shenzhen (CN)

(72) Inventors: Jianjiang Chen, Shenzhen (CN); Yuanyuan Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 48 days.

(21) Appl. No.: 15/522,500

(22) PCT Filed: Mar. 2, 2015

(86) PCT No.: PCT/CN2015/073507
§ 371 (c)(1),
(2) Date: Apr. 27, 2017

(87) PCT Pub. No.: WO2015/184873
PCT Pub. Date: Dec. 10, 2015

(65) Prior Publication Data
US 2017/0316270 A1    Nov. 2, 2017

(30) Foreign Application Priority Data
Oct. 28, 2014  (CN) .......................... 2014 1 0587144

(51) Int. Cl.
*H04N 5/262* (2006.01)
*G06K 9/00* (2006.01)
(Continued)

(52) U.S. Cl.
CPC .......... *G06K 9/00744* (2013.01); *G06T 7/194* (2017.01); *G06T 11/60* (2013.01);
(Continued)

(58) Field of Classification Search
CPC .......... H04N 5/23232; H04N 5/23238; H04N 5/2356; H04N 5/2621; H04N 5/272; G06K 2009/2045
(Continued)

(56) References Cited

U.S. PATENT DOCUMENTS 9,519,983 B2    12/2016  Koyama
2008/0303949 A1 12/2008  Ciudad et al.
(Continued)

FOREIGN PATENT DOCUMENTS

CN    102339625    2/2012
CN    103049894    4/2013
(Continued)

OTHER PUBLICATIONS

Extended European Search Report dated Sep. 27, 2017 for European Patent Application No. 15803979.2.
(Continued)

*Primary Examiner* — Kelly L Jerabek
(74) *Attorney, Agent, or Firm* — Plumsea Law Group, LLC (57) ABSTRACT

A method, system, and device for processing video shooting are described. The method includes: shooting a subject in a background sample, the background sample, and a target background respectively, to generate a first video recording the subject and the background sample, a second video recording the background sample, and a third video recording the target background respectively, the shooting time lengths of the first video and the second video being smaller than the shooting time length of the third video; and comparing the first video and the second video, extracting images of the subject from the first video, generating a subject image frame sequence with a transparent background, sequentially superimposing each subject image frame in the subject image frame sequence to the third video, and generating a video file recording the subject and the target background.

20 Claims, 2 Drawing Sheets

(51) Int. Cl.
*H04N 5/232* (2006.01)
*G06T 11/60* (2006.01)
*H04N 5/272* (2006.01)
*G06T 7/194* (2017.01)

(52) U.S. Cl.
CPC ......... *H04N 5/232* (2013.01); *H04N 5/23222* (2013.01); *H04N 5/23229* (2013.01); *H04N 5/272* (2013.01); *G06K 2009/00738* (2013.01); *G06T 2207/10016* (2013.01)

(58) Field of Classification Search
USPC .................................. 348/222.1, 218.1, 239
See application file for complete search history.

(56) References Cited

U.S. PATENT DOCUMENTS

| | | | |
|---|---|---|---|
| 2010/0134692 A1 | 6/2010 | Costello et al. | |
| 2013/0216206 A1* | 8/2013 | Dubin | H04N 9/87 386/282 |
| 2013/0342629 A1 | 12/2013 | North et al. | |
| 2014/0087877 A1* | 3/2014 | Krishnan | A63F 13/65 463/33 |
| 2015/0062283 A1* | 3/2015 | Mintz | H04N 7/141 348/14.07 |

FOREIGN PATENT DOCUMENTS

| | | |
|---|---|---|
| CN | 103813106 | 5/2014 |
| CN | 103813106 A | 5/2014 |
| CN | 103903213 | 7/2014 |
| JP | 2004336172 A | 11/2004 |
| JP | 2006109211 A | 4/2006 |
| JP | 2010239447 A | 10/2010 |
| JP | 2011193117 A | 9/2011 |
| WO | 2008/126371 A1 | 10/2008 |
| WO | 2012/038924 A2 | 3/2012 |

OTHER PUBLICATIONS

International Search Report for PCT/CN2015/073507, English Translation attached to original, Both completed by the Chinese Patent Office on Jul. 5, 2015 All together 5 Pages.

Office Action dated Mar. 27, 2018 for Japanese Patent Application No. 2017-522631.

* cited by examiner

Shoot a subject in a background sample, the background sample and a target background respectively, generate a first video recording the subject and the background sample, a second video recording the background sample and a third video recording the target background respectively ⌒ S10

Compare the first video with the second video, extract a subject image from the first video to generate a subject image frame sequence of which a background is transparent, and superimpose in turn each subject image frame in the subject image frame sequence onto the third video to generate video file recording the subject and the target background ⌒ S20

METHOD, SYSTEM, AND DEVICE FOR PROCESSING VIDEO SHOOTING

CROSS-REFERENCE TO RELATED APPLICATION

This application is the U.S. national phase of PCT Application No. PCT/CN2015/073507 filed Mar. 2, 2015, which claims priority to Chinese Application No. 201410587144.1 filed Oct. 28, 2014, the disclosures of which are incorporated in their entirety by reference herein.

TECHNICAL FIELD

The present disclosure relates to the field of video shooting technologies, and in particularly, to a method, system and apparatus for processing video shooting.

BACKGROUND

Shooting of a mobile phone is a very important function. Taking pictures and videos with the mobile phone is very frequent during the daily use of the current mobile phone. A user who takes pictures and videos with the mobile phone is not satisfied with ordinary results. Various special effects of photography of the mobile phone can enhance the appeal of photography and suit sharing and communication between users. At present, beautifying photography effects for the mobile phone has becoming a trend in development, and the speed of its development has exceeded that of card cameras.

A main principle of a motion video, i.e., shooting a formerly slowly changing object into an object that changes faster, is to lengthen the time between sample video frames (e.g., by 1 frame per second) during shooting and play the video at a normal frame rate (e.g., 30 frames per second) during playing. For example, a playback effect of the shot cloud movement in the sky is to form cloud changing fast in the sky. As another example, a fast changing sunset and a fast moving nebula can be formed. Such effects can give people a feeling of great momentum.

However, it has been found in the process of shooting a motion video that it is very difficult to shoot portraits using the motion video. This is because that the duration of shooting the motion video is longer, typically several minutes or even several hours are taken for shooting, but if a user is asked to hold in front of a camera by a photographer for several minutes or several hours to shoot the motion video, it is hard for the user to endure, greatly affecting the user's fun of shooting the motion video.

Therefore, there is a need for an appropriate solution to deal with the problem of portrait shooting in motion videos.

SUMMARY

A technique problem to be solved by embodiments of the present disclosure is to provide a method, system and apparatus for processing motion video shooting so as to shorten the time for a subject to appear in front of a camera during long motion video shooting, thereby improving user experience.

In order to solve the technique problem described above, an embodiment of the present disclosure provides a method for processing video shooting including:

shooting a subject in a background sample, the background sample and a target background respectively, generating a first video recording the subject and the background sample, a second video recording the background sample and a third video recording the target background respectively, herein shooting durations of the first video and the second video are less than a shooting duration of the third video; and comparing the first video with the second video, extracting a subject image from the first video to generate a subject image frame sequence of which a background is transparent, and superimposing in turn each frame subject image in the subject image frame sequence onto the third video to generate a video file recording the subject and the target background.

In an exemplary embodiment, shooting a subject in a background sample, the background sample and a target background respectively, generating a first video recording the subject and the background sample, a second video recording the background sample and a third video recording the target background respectively includes:

shooting the subject in the background sample at a first shooting sample rate after an instruction for shooting the subject is received, and generating the first video after an instruction for stopping the shooting is received;

shooting the background sample at the first shooting sample rate after an instruction for shooting the background sample is received, and generating the second video after an instruction for stopping the shooting is received; and shooting the target background at a second shooting sample rate after an instruction for shooting the target background is received, and generating the third video after an instruction for stopping the shooting is received, herein the first shooting sample rate is greater than the second shooting sample rate.

In an exemplary embodiment, comparing the first video with the second video, extracting a subject image from the first video to generate a subject image frame sequence of which a background is transparent includes:

extracting a frame image from the second video as a background sample image; and comparing each frame image in the first video with the background sample image, removing the background sample image from each frame image in the first video and only retaining the subject image to generate a subject image frame sequence of which the background is transparent, except for the subject.

In an exemplary embodiment, inserting in turn each frame subject image in the subject image frame sequence onto the third video includes:

inserting each frame subject image in the subject image frame sequence into a bit stream of the third video, and if the bit stream of the third video has not reached a last frame, then using circularly the subject image frame sequence for image superposition.

In an exemplary embodiment, the video file recording the subject and the target background is played circularly by a player.

An embodiment of the present disclosure further provides a system for processing video shooting including:

a shooting module configured to shoot a subject in a background sample, the background sample and a target background respectively, generate a first video recording the subject and the background sample, a second video recording the background sample and a third video recording the target background respectively, herein shooting durations of the first video and the second video are less than a shooting duration of the third video; and a video processing module configured to compare the first video with the second video, extract a subject image from the first video to generate a subject image frame sequence of which a background is transparent, and superimpose in turn each frame subject image in the subject image frame sequence onto the third video to generate a video file recording the subject and the target background.

In an exemplary embodiment, the shooting module is configured to:

shoot the subject in the background sample at a first shooting sample rate after an instruction for shooting the subject is received, and generate the first video after an instruction for stopping the shooting is received;

shoot the background sample at the first shooting sample rate after an instruction for shooting the background sample is received, and generate the second video after an instruction for stopping the shooting is received; and shoot the target background at a second shooting sample rate after an instruction for shooting the target background is received, and generate the third video after an instruction for stopping the shooting is received, herein the first shooting sample rate is greater than the second shooting sample rate.

In an exemplary embodiment, the video processing module is configured to compare the first video with the second video and extract a subject image from the first video to generate a subject image frame sequence of which the background is transparent by:

extracting a frame image from the second video as a background sample image; and comparing each frame image in the first video with the background sample image, removing the background sample image from each frame image in the first video and only retaining the subject image to generate a subject image frame sequence of which the background is transparent, except for the subject.

In an exemplary embodiment, the video processing module is configured to insert in turn each frame subject image in the subject image frame sequence onto the third video by:

inserting each frame subject image in the subject image frame sequence into a bit stream of the third video, and if the bit stream of the third video has not reached a last frame, then using circularly the subject image frame sequence for image superposition.

In an exemplary embodiment, the video file recording the subject and the target background is played circularly by a player.

An embodiment of the present disclosure provides an apparatus for shooting a video including a camera and a processor, herein the camera is configured to, under control of the processor, shoot a subject in a background sample, the background sample and a target background respectively, generate a first video recording the subject and the background sample, a second video recording the background sample and a third video recording the target background respectively, herein shooting duration of the first video and the second video are less than a shooting duration of the third video; and the processor is configured to control the camera to shoot, compare the first video with the second video, extract a subject image from the first video to generate a subject image frame sequence of which a background is transparent, and superimpose in turn each frame subject image in the subject image frame sequence onto the third video to generate a video file recording the subject and the target background.

In an exemplary embodiment, the camera is configured to:

shoot the subject in the background sample at a first shooting sample rate after an instruction for shooting the subject is received, and generate the first video after an instruction for stopping the shooting is received;

shoot the background sample at the first shooting sample rate after an instruction for shooting the background sample is received, and generate the second video after an instruction for stopping the shooting is received; and shoot the target background at a second shooting sample rate after an instruction for shooting the target background is received, and generate the third video after an instruction for stopping the shooting is received, herein the first shooting sample rate is greater than the second shooting sample rate.

In an exemplary embodiment, the processor is configured to compare the first video with the second video and extract a subject image from the first video to generate a subject image frame sequence of which the background is transparent by:

extracting a frame image from the second video as a background sample image; and comparing each frame image in the first video with the background sample image, removing the background sample image from each frame image in the first video and only retaining the subject image to generate a subject image frame sequence of which the background is transparent, except for the subject.

In an exemplary embodiment, the processor is configured to insert in turn each frame subject image in the subject image frame sequence onto the third video by:

inserting each frame subject image in the subject image frame sequence into a bit stream of the third video, and if the bit stream of the third video has not reached a last frame, then using circularly the subject image frame sequence for image superposition.

In an exemplary embodiment, the apparatus further includes:

a display screen, herein the processor is further configured to control the video file recording the subject and the target background to be played circularly on the display screen.

An embodiment of the present disclosure further provides a computer readable storage medium, storing program instructions, when the program instructions are executed, the method described above is performed.

Compared with the existing technology, the method and system provided by the embodiments of the present disclosure can process a short video of a subject into a subject image frame sequence of which a background is transparent by shooting the short video of the subject, a short video of a background sample and a long video of a target background respectively, and superimpose the subject image frame sequence of which the background is transparent onto the long video of the target background to generate a motion video file of the subject in the target background, so as to shorten the time for the subject to appear in front of a camera during long motion video shooting, thereby improving user experience.

DETAILED DESCRIPTION

Embodiments of the present disclosure will be described in detail below in conjunction with the accompanying drawings. It should be noted that the embodiments of the present application and features in the embodiments can be combined with each other arbitrarily without conflict.

Figure 1:
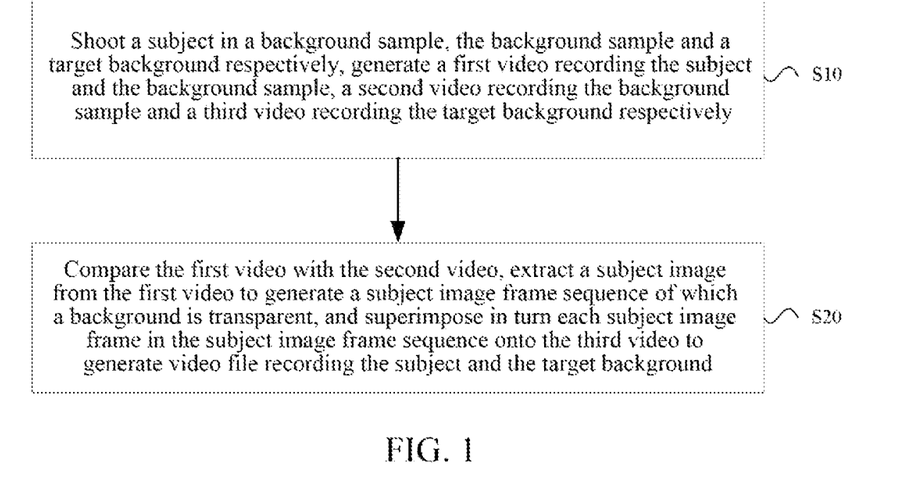
FIG. 1 is a flow chart of a method for processing video shooting in according to an embodiment of the present disclosure.

As shown in FIG. 1, an embodiment of the present disclosure provides a method for processing video shooting including steps S10-S20.

In step S10: shoot a subject in a background sample, the background sample and a target background respectively, generate a first video recording the subject and the background sample, a second video recording the background sample and a third video recording the target background respectively; and In step S20: compare the first video with the second video, and extract a subject image from the first video to generate a subject image frame sequence of which a background is transparent, and superimpose in turn each frame subject image in the subject image frame sequence onto the third video to generate a video file recording the subject and the target background.

Herein, the subject in the background sample and the background sample may be shot in a short time and the target background may be shot at a low speed in a long time.

The method further includes the following characteristics.

Herein, Shoot the subject in the background sample, the background sample and the target background respectively, generate the first video recording the subject and the background sample, the second video recording the background sample and the third video recording the target background respectively in following way.

Shoot the subject in the background sample at a first shooting sample rate after an instruction for shooting the subject is received, and generate the first video after an instruction for stopping the shooting is received.

Shoot the background sample at the first shooting sample rate after an instruction for shooting the background sample is received, and generate the second video after an instruction for stopping the shooting is received.

Shoot the target background at a second shooting sample rate after an instruction for shooting the target background is received, and generate the third video after an instruction for stopping the shooting is received.

Herein the first shooting sample rate is greater than the second shooting sample rate.

Compare the first video with the second video and extract the subject image from the first video to generate the subject image frame sequence of which the background is transparent includes following way.

Extract an frame image from the second video as a background sample image.

Compare each frame image in the first video with the background sample image, remove the background sample image from each frame image in the first video and retaining only the subject image to generate the subject image frame sequence of which the background is transparent, except for the subject.

Herein the subject image frame sequence includes one or more frame subject images.

Superimpose in turn each subject frame image in the subject image frame sequence onto the third video in following way.

insert each frame subject image in the subject image frame sequence into a bit stream of the third video, and if the bit stream of the third video has not reached the last frame, then use circularly the subject image frame sequence for image superposition.

The motion video file recording the subject and the target background is played circularly by a player.

Figure 2:
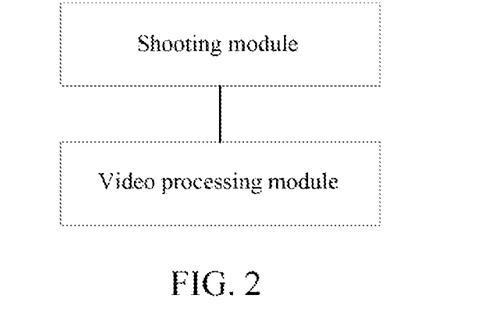
FIG. 2 is a schematic diagram of a system for processing video shooting in according to an embodiment of the present disclosure.

As shown in FIG. 2, an embodiment of the present disclosure further provides a system for processing video shooting including a shooting module and a video processing module.

The shooting module is configured to shoot a subject in a background sample, the background sample and a target background respectively, generate a first video recording the subject and the background sample, a second video recording the background sample and a third video recording the target background respectively, herein shooting durations of the first video and the second video are less than a shooting duration of the third video.

The video processing module is configured to compare the first video with the second video, extract a subject image from the first video to generate a subject image frame sequence of which a background is transparent, and superimpose in turn each subject frame image in the subject image frame sequence onto the third video to generate a video file recording the subject and the target background.

The shooting module is configured to shoot the subject in the background sample at a first shooting sample rate after an instruction for shooting the object is received, and generate the first video after an instruction for stopping the shooting is received, shoot the background sample at the first shooting sample rate after an instruction for shooting the background sample is received, and generate the second video after an instruction for stopping the shooting is received, and shoot the target background at a second shooting sample rate after an instruction for shooting the target background is received, and generate the third video after an instruction for stopping the shooting is received.

Herein the first shooting sample rate is greater than the second shooting sample rate.

The video processing module is configured to compare the first video with the second video and extract the subject image from the first video to generate the subject image frame sequence of which the background is transparent in following way.

The video processing module extracts a frame image from the second video as a background sample image, compares each frame image in the first video with the background sample image, removes the background sample image from each frame image in the first video and retains only the subject image to generate the subject image frame sequence of which the background is transparent, except for the subject.

The video processing module is configured to superimpose in turn each subject frame image in the subject image frame sequence onto the third video in following way.

The video processing module insert each frame subject image in the subject image frame sequence into a bit stream of the third video, and if the bit stream of the third video has not reached the last frame yet, then use circularly the subject image frame sequence for image superposition.

The motion video file recording the subject and the target background is played circularly by a player.

Figure 3:
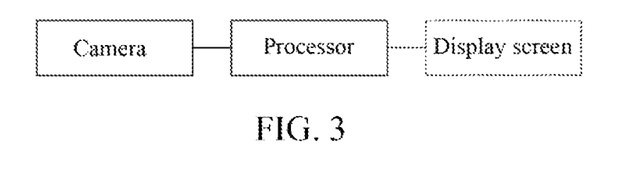
FIG. 3 is a schematic diagram of an apparatus for shoot a video in according to an embodiment of the present disclosure.

As shown in FIG. 3, an embodiment of the present disclosure provides an apparatus for shooting a video including a camera and a processor. Herein the camera is configured to, under control of the processor, shoot a subject in a background sample, the background sample and a target background respectively, generate a first video recording the subject and the background sample, a second video recording the background sample and a third video recording the target background respectively. Herein shooting durations of the first video and the second video are less than a shooting duration of the third video.

The processor is configured to control the camera to shoot, compare the first video with the second video, extract a subject image from the first video to generate a subject image frame sequence of which a background is transparent, and superimpose in turn each subject frame image in the subject image frame sequence onto the third video to generate a video file recording the subject and the target background.

The camera is configured to shoot the subject in the background sample at a first shooting sample rate after an instruction for shooting the object is received, and generate the first video after an instruction for stopping the shooting is received, shoot the background sample at the first shooting sample rate after an instruction for shooting the background sample is received, and generate the second video after an instruction for stopping the shooting is received, and shoot the target background at a second shooting sample rate after an instruction for shooting the target background is received, and generate the third video after an instruction for stopping the shooting is received, Herein the first shooting sample rate is greater than the second shooting sample rate.

The processor is configured to compare the first video with the second video and extract the subject image from the first video to generate the subject image frame sequence of which the background is transparent in following way.

The processor extracts a frame image from the second video as a background sample image, compares each frame image in the first video with the background sample image, removes the background sample image from each frame image in the first video and retains only the subject image to generate the subject image frame sequence of which the background is transparent, except for the subject.

The processor is configured to insert in turn each subject frame image in the subject image frame sequence onto the third video in following way.

The processor inserts each frame subject image in the subject image frame sequence into a bit stream of the third video, and if the bit stream of the third video has not reached the last frame yet, then uses circularly the subject image frame sequence for image superposition.

The apparatus further includes a display screen, herein the processor is further configured to control the video file recording the subject and the target background to be played circularly on the display screen.

Application Example

Figure 4:
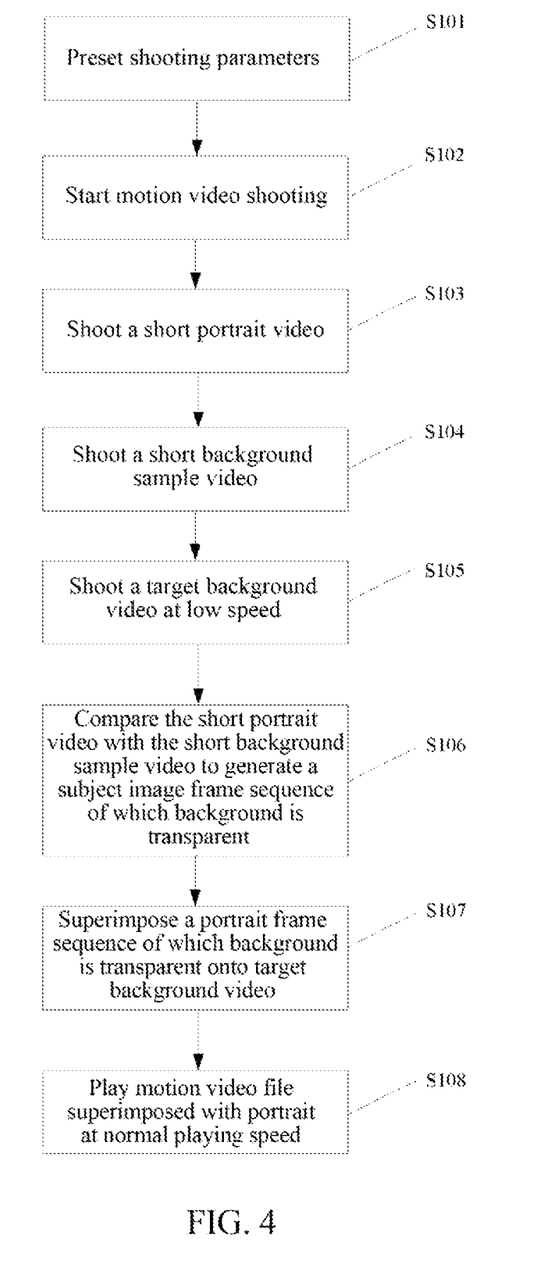
FIG. 4 is a flow chart of a method for processing motion video shooting in according to an application example of the present disclosure.

As shown in FIG. 4, a process of shooting a portrait motion video by a mobile phone is provided which includes the following steps.

In step S101: preset shooting parameters and wait for a user to start motion video shooting.

The shooting parameters may include one or more of the following parameters: a low speed shooting sample rate of shooting a target background, a shooting duration of a portrait in a background sample and a shooting duration of the target background.

In step S102: detect that the user starts the motion video shooting.

In step S103: detect an instruction for shooting the portrait to shoot a portrait video clip, and stop the shooting of the portrait after an instruction for stopping the shooting is received, or stop the shooting of the portrait when the preset shooting duration is reached, to generate a short portrait video.

For example, a person in a viewing frame is shot at a normal shooting sample rate (e.g., 30 frames per second) in succession for 3 seconds. That is, when the user is detected to press a stop button or the preset shooting duration (e.g., 3 seconds) is reached, the shooting of the portrait is stopped and the portrait video clip is generated. Prompt information of completion of the shooting of the portrait may be further displayed to the user after the completion of the shooting.

The background sample in the viewing frame may be the same as or different from the target background.

In step S104: detect an instruction for shooting the background sample to shoot a background sample video clip, and stop the shooting of the background sample after an instruction for stopping the shooting is received, or stop the shooting of the background sample when the preset shooting duration is reached, generate a short background sample video.

For example, the background sample in a viewing frame is shot at a normal shooting sample rate (e.g., 30 frames per second) in succession for 1 second. That is, when the user is detected to press a stop button or the preset shooting duration (e.g., 1 second) is reached, the shooting of the background sample is stopped and the background sample video clip is generated. Prompt information of completion of the shooting of the background sample may be further displayed to the user after the completion of the shooting.

In step S105: detect an instruction for shooting the target background to shoot the target background at a low speed, and stop the shooting of the target background after an instruction for stopping the shooting is received, or stop the shooting of the target background when the preset shooting duration is reached, generate a target background video.

For example, the target background is shot at a low speed shooting sample rate (e.g., 1 frame per second) lower than a normal shooting sample rate in succession for 3 minutes (180 seconds). That is, when the user is detected to press a stop button or the preset shooting duration (e.g., 3 minutes) is reached, the shooting of the target background is stopped and a long target background video is generated. Prompt information of completion of the shooting of the target background may be further displayed to the user after the completion of the shooting.

Herein, the low speed shooting refers to 1 frame per 0.2-60 seconds, and 1 frame per 1-5 seconds is frequently used.

In step S106: compare the short portrait video with the short background sample video to generate a subject image frame sequence of which the background is transparent, except for the shot subject (portrait).

In step S107: sample the target background video to obtain a sequence of frames and superimpose in turn the portrait frame sequence of which the background is transparent onto the target background sampling frame to generate the superimposed motion video file of the portrait.

In step S108: play the motion video file at a normal playing speed (e.g., 30 frames per second).

A player may play the motion video file circularly.

Herein, the sample of the target background is set to 1 frame per second, so 180 target background frames may be shot in 3 minutes. Therefore, 180 target background frames are contained in a bit stream of the motion video superimposed with the portrait. When the played frame frequency of the player is 30 frames per second, 180 frames can be played in 6 seconds. That is, the playing of a video of 3 minutes (180 seconds) will be completed in 6 seconds, so the time is accelerated by a factor of 30, thereby implementing a special effect of fast movement of the portrait and the target background (e.g., clouds, sun or ships).

In the case that the technique scheme of the present disclosure is not used, the shot subject (e.g., person) has to hold for 3 minutes in front of a camera, which can not be accepted by most of users. Therefore, using the motion video shooting scheme described above can greatly decrease the time for the shot subject (e.g., person) to appear in front of the camera to implement the special effect of causing a slowly moving object to move fast, bring a new surprise experience to the camera of the mobile phone.

The method and system for processing motion video shooting provided by the embodiments of the present disclosure can process a short video of a subject into a subject image frame sequence of which a background is transparent by shooting the short video of the subject, a short video of a background sample and a long video of a target background respectively, and superimpose the subject image frame sequence of which the background is transparent onto the long video of the target background to generate a motion video file of the subject in the target background, so as to shorten the time for the subject to appear in front of a camera during long motion video shooting, thereby improving user experience.

Those skilled in the art may understand that all or part of steps in the embodiment described above can be carried out using computer program flows. The computer program may be stored in a computer readable medium and executed on a corresponding hardware platform (such as system, device, apparatus, appliance, etc.). When the computer program is executed, one of the steps or a combination thereof in the method embodiment may be executed.

In an exemplary embodiment, all or part of the steps in the embodiment described above may also be implemented using integrated circuits. These steps may be fabricated into separated integrated circuit modules respectively, or a plurality of modules or steps of them may be fabricated into a single integrated circuit module.

Various apparatus/functional modules/functional units in the embodiment described above may be implemented using general-purpose computing apparatuses, or they may be centralized on a single computing apparatus or may be distributed in a network composed of a plurality of computing apparatuses.

When various apparatus/functional modules/functional units in the embodiment described above are implemented in a form of software function module or sold or used as independent products, they can be stored in a computer readable storage medium. The computer readable storage medium mentioned above may be a read only memory, a magnetic disk or optical disk.

INDUSTRIAL APPLICABILITY

The embodiments of the present disclosure can shorten the time for a subject to appear in front of a camera during long motion video shooting, thereby improving user experience.

What we claim is:

1. A method for processing motion video shooting comprising:

shooting a subject in a background sample, the background sample and a target background respectively, generating respectively a first video file in which both the subject and the background sample are recorded, a second video file in which the background sample is recorded and a third video file in which the target background is recorded, wherein shooting durations of the first video file and the second video file are less than a shooting duration of the third video file; and comparing the first video file with the second video file, extracting a subject image from the first video file to generate a subject image frame sequence of which a background is transparent, and superimposing in turn each frame subject image in the subject image frame sequence onto the third video file to generate a motion video file in which the subject and the target background are recorded.

2. The method according to claim 1, wherein:

shooting a subject in a background sample, the background sample and a target background respectively, generating respectively a first video file in which both the subject and the background sample are recorded, a second video file in which the background sample is recorded and a third video file in which the target background is recorded comprises:

shooting the subject in the background sample at a first shooting sample rate after an instruction for shooting the object is received, and generating the first video file after an instruction for stopping the shooting is received;

shooting the background sample at the first shooting sample rate after an instruction for shooting the background sample is received, and generating the second video file after an instruction for stopping the shooting is received; and shooting the target background at a second shooting sample rate after an instruction for shooting the target background is received, and generating the third video file after an instruction for stopping the shooting is received, wherein the first shooting sample rate is greater than the second shooting sample rate.

3. The method according to claim 2, wherein:

inserting in turn each frame subject image in the subject image frame sequence onto the third video file comprises:

inserting each frame subject image in the subject image frame sequence into a bit stream of the third video file, and if the bit stream of the third video file has not reached a last frame, then using circularly the subject image frame sequence for image superposition.

4. The method according to claim 1, wherein:

comparing the first video file with the second video file, extracting a subject image from the first video file to generate a subject image frame sequence of which a background is transparent comprises:

extracting a frame image from the second video file as a background sample image; and comparing each frame image in the first video file with the background sample image, removing the background sample image from each frame image in the first video file and only retaining the subject image to generate a subject image frame sequence of which the background is transparent, except for the subject.

5. The method according to claim 4, wherein:
inserting in turn each frame subject image in the subject image frame sequence onto the third video file comprises:
inserting each frame subject image in the subject image frame sequence into a bit stream of the third video file, and if the bit stream of the third video file has not reached a last frame, then using circularly the subject image frame sequence for image superposition.

6. The method according to claim 1, wherein:
inserting in turn each frame subject image in the subject image frame sequence onto the third video file comprises:
inserting each frame subject image in the subject image frame sequence into a bit stream of the third video file, and if the bit stream of the third video file has not reached a last frame, then using circularly the subject image frame sequence for image superposition.

7. The method according to claim 1, wherein:
the motion video file in which the subject and the target background are recorded is played circularly by a player.

8. A non-transitory computer readable storage medium, storing program instructions wherein, when program instructions are executed, the method according to claim 1 is performed.

9. A system for processing motion video shooting comprising a processor and a storage device, wherein the storage device stores processor-executable programs, and the programs comprise:
a shooting module configured to shoot a subject in a background sample, the background sample and a target background respectively, generate respectively a first video file in which both the subject and the background sample are recorded, a second video file in which the background sample is recorded and a third video file in which the target background is recorded, wherein shooting durations of the first video file and the second video file are less than a shooting duration of the third video file; and
a video processing module configured to compare the first video file with the second video file, extract a subject image from the first video file to generate a subject image frame sequence of which a background is transparent, and superimpose in turn each frame subject image in the subject image frame sequence onto the third video file to generate a motion video file in which the subject and the target background are recorded.

10. The system according to claim 9, wherein:
the shooting module is configured to:
shoot the subject in the background sample at a first shooting sample rate after an instruction for shooting the subject is received, and generate the first video file after an instruction for stopping the shooting is received;
shoot the background sample at the first shooting sample rate after an instruction for shooting the background sample is received, and generate the second video file after an instruction for stopping the shooting is received; and
shoot the target background at a second shooting sample rate after an instruction for shooting the target background is received, and generate the third video file after an instruction for stopping the shooting is received,
wherein the first shooting sample rate is greater than the second shooting sample rate.

11. The system according to claim 10, wherein:
the video processing module is configured to insert in turn each frame subject image in the subject image frame sequence onto the third video file by:
inserting each image subject image in the subject image frame sequence into a bit stream of the third video file, and if the bit stream of the third video file has not reached a last frame, then using circularly the subject image frame sequence for image superposition.

12. The system according to claim 9, wherein:
the video processing module is configured to compare the first video file with the second video file and extract a subject image from the first video file to generate a subject image frame sequence of which the background is transparent by:
extracting a frame image from the second video file as a background sample image; and
comparing each frame image in the first video file with the background sample image, removing the background sample image from each frame image in the first video file and only retaining the subject image to generate a subject image frame sequence of which the background is transparent, except for the subject.

13. The system according to claim 12, wherein:
the video processing module is configured to insert in turn each frame subject image in the subject image frame sequence onto the third video file by:
inserting each image subject image in the subject image frame sequence into a bit stream of the third video file, and if the bit stream of the third video file has not reached a last frame, then using circularly the subject image frame sequence for image superposition.

14. The system according to claim 9, wherein:
the video processing module is configured to insert in turn each frame subject image in the subject image frame sequence onto the third video file by:
inserting each image subject image in the subject image frame sequence into a bit stream of the third video file, and if the bit stream of the third video file has not reached a last frame, then using circularly the subject image frame sequence for image superposition.

15. The system according to claim 9, wherein:
the motion video file in which the subject and the target background are recorded is played circularly by a player.

16. An apparatus for shooting a motion video comprising a camera and a processor, wherein the camera is configured to, under control of the processor, shoot a subject in a background sample, the background sample and a target background respectively, generate respectively a first video file in which both the subject and the background sample are recorded, a second video file in which the background sample is recorded and a third video file in which the target background is recorded, wherein shooting durations of the first video file and the second video file are less than a shooting duration of the third video file; and
the processor is configured to control the camera to shoot, compare the first video file with the second video file, extract a subject image from the first video file to generate a subject image frame sequence of which a background is transparent, and superimpose in turn each frame subject image in the subject image frame sequence onto the third video file to generate a motion video file in which the subject and the target background are recorded.

17. The apparatus according to claim 16, wherein:
the camera is configured to:
shoot the subject in the background sample at a first shooting sample rate after an instruction for shooting the object is received, and generate the first video file after an instruction for stopping the shooting is received;
shoot the background sample at the first shooting sample rate after an instruction for shooting the background sample is received, and generate the second video file after an instruction for stopping the shooting is received; and
shoot the target background at a second shooting sample rate after an instruction for shooting the target background is received, and generate the third video file after an instruction for stopping the shooting is received,
wherein the first shooting sample rate is greater than the second shooting sample rate.

18. The apparatus according to claim 16, wherein:
the processor is configured to compare the first video file with the second video file and extract a subject image from the first video file to generate the subject image frame sequence of which a background is transparent by:
extracting a frame image from the second video file as a background sample image; and
comparing each frame image in the first video file with the background sample image, removing the background sample image from each frame image in the first video file and only retaining the subject image to generate a subject image frame sequence of which the background is transparent, except for the subject.

19. The apparatus according to claim 16, wherein:
the processor is configured to insert in turn each subject frame image in the subject image frame sequence onto the third video file by:
inserting each subject frame image in the subject image frame sequence into a bit stream of the third video file, and if the bit stream of the third video file has not reached a last frame, then using circularly the subject image frame sequence for image superposition.

20. The apparatus according to claim 16, further comprising:
a display screen, wherein the processor is further configured to control the motion video file in which the subject and the target background are recorded to be played circularly on the display screen.

* * * * *